US00RE36722E

United States Patent [19]

Reasoner

[11] E Patent Number: Re. 36,722

[45] Reissued Date of Patent: Jun. 6, 2000

[54] REMOTE CONTROL ASSEMBLY WITH VIBRATION DAMPENER

[75] Inventor: Michael V. Reasoner, Grand Blanc, Mich.

[73] Assignee: Teleflex Incorporated, Plymouth Meeting, Pa.

[21] Appl. No.: 09/136,953

[22] Filed: Aug. 19, 1998

Related U.S. Patent Documents

Reissue of:

[64] Patent No.: 5,448,926
Issued: Sep. 12, 1995
Appl. No.: 08/147,390
Filed: Nov. 3, 1993

[51] Int. Cl.[7] ..... F16C 1/10

[52] U.S. Cl. ..... 74/500.5; 74/502

[58] Field of Search ..... 74/500.5, 501.5 R, 74/502, 502.4, 502.6

[56] References Cited

U.S. PATENT DOCUMENTS 4,348,348 9/1982 Bennett et al. .
4,406,177 9/1983 Bennett et al. .
4,726,251 2/1988 Niskanen .

OTHER PUBLICATIONS

Sep. 13, 1983 General Motors drawing No. 10034332.

*Primary Examiner*—Mary Ann Battista
*Attorney, Agent, or Firm*—Howard & Howard

[57] ABSTRACT

A motion transmitting remote control assembly (10) transmits motion in a curved path by a flexible core element (12). A flexible tubular conduit (14) slidably supports the core element (12) and includes an inner end fitting (26) comprising an annular flange (28) disposed at one end (18) thereof. An elastomeric vibration dampening isolator (34) includes a right half section (36) and a left half section (38) disposed on opposite sides of the flange (28). A casing (44) also includes right (46) and left (48) half sections which engage the exterior of the respective right (36) and left (38) half sections of the isolator (34). The right (46) and left (48) half sections of the casing (44) include coacting force-fit snap locks (50) for retaining the right (36) and left (38) half sections of the isolator (34) in operative engagement with the flange (28).

22 Claims, 4 Drawing Sheets

REMOTE CONTROL ASSEMBLY WITH VIBRATION DAMPENER

Matter enclosed in heavy brackets [ ] appears in the original patent but forms no part of this reissue specification; matter printed in italics indicates the additions made by reissue.

TECHNICAL FIELD

The subject invention relates generally to a motion transmitting remote control assembly of the type for transmitting motion in a curved path by a flexible motion transmitting core element, and more particularly to such an assembly including a conduit having a vibration isolator disposed at one end thereof.

BACKGROUND ART

Motion transmitting remote control assemblies are provided in many applications for transmitting motion in a curved path by a flexible motion transmitting core element slidably disposed in a conduit. Although such assemblies are not limited to use in the automotive environment, typical automotive applications include the control of automatic transmissions, clutches, accelerator, and cruise controls, HVAC vents, and the like. The conduits of such assemblies are supported at their two opposite ends on a bulk head, fire wall, engine bracket, transmission bracket, or other support fixture in the vehicle. In many applications, the support fixture vibrates while the automobile is in operation, particularly when the support fixture extends from the engine or transmission. A problem arises when vibrations in the support fixture are passed through the cable via an end fitting on the conduit.

There are assemblies in the prior art where vibration dampening means are used to isolate vibrations which normally pass from the vibrating support fixture through the end fitting of the conduit to the core element such that the vibrations are effectively attenuated or dampened. Examples of such prior art vibration dampening means may be found in U.S. Pat. No. 4,406,177 to Bennett et al., issued Sep. 27, 1983 and U.S. Pat. No. 4,726,251 to Niskanen, issued Feb. 23, 1988, both assigned to the assignee of the subject invention and the disclosures of which are hereby incorporated by reference. These assemblies include an end fitting disposed around one end of the conduit. The end fitting is surrounded by an outer casing which attaches to the support fixture to support the one end of the conduit on the vibrating support fixture. A resilient vibration dampener is disposed between the casing and the end fitting on the conduit for providing noise and vibration isolation therebetween. In this manner, the casing is completely insulated from the conduit by the vibration dampener, and the vibration dampener is held in place by the casing.

As perhaps best shown in U.S. Pat. No. 4,348,348 to Bennett et al, issued Sep. 7, 1982 and assigned to the assignee of the subject invention, the disclosure of which is hereby incorporated by reference, vibration dampeners are typically insert-molded onto the inner end fitting of the conduit. In a different plastic injection mold cavity, the casing is later overmolded about the vibration dampener. Although this practice is efficient and yields cable assemblies of consistent high quality, there are nevertheless some drawbacks.

One disadvantage of overmolding the plastic casing about the vibration dampener is that only relatively high durometer elastomeric materials can be used. It will be readily appreciated by those skilled in the art that lower durometer materials are often preferable and will, in general, provide increased vibration dampening. Also, the practice of insert molding one integral vibration dampener having a uniform durometer is somewhat restrictive because it may be beneficial in some instances to provide a multi-durometer vibration dampener. However, present techniques for molding multi-durometer members require multiple molds which can be very-expensive. In addition, the overmolded vibration dampeners are permanently encapsulated in the casing, which prevents repair or replacement of defective or worn vibration dampers. This same fact also results in compounded inventory commitments whereby otherwise identical cable assemblies having different durometer vibration dampeners must be stored. Thus, because the vibration dampener can not be accessed for exchange of a different durometer vibration dampener, an inventory of cable assemblies of each useful durometer must be maintained.

SUMMARY OF THE INVENTION AND ADVANTAGES

The subject invention comprises a motion transmitting remote control assembly of the type for transmitting motion in a curved path by a flexible core element. The assembly comprises a flexible tubular conduit extending between opposite ends and a flexible core element slidably supported in the conduit. An isolator means surrounds one of the ends of the conduit for dampening vibration transmissions to the conduit. An attachment means has an operative position adjacent the one end of the conduit for attaching the conduit to a vibrating support fixture. The improvement of the invention comprises a casing means which is moveable from a detached condition to a locked condition for mechanically locating and retaining the attachment means in the operative position while maintaining vibration isolation between the attachment means and the conduit.

The moveable casing means provides several distinct advantages. Because the casing is manually movable from a detached condition to a locked condition over the isolator means, much lower durometer isolator means, and hence improved vibration isolation, can be used as compared to traditional overmolding or insert molding techniques. Also, the manually positioned casing means is much more conducive to multi-piece and multi-durometer isolator means, as well as making repair or replacement of the isolator means more convenient. Additionally, the casing means which is moveable from a detached condition to a locked condition over the isolator means reduces inventory requirements whereby the casing means may be mass produced and used for different cable assemblies having different durometer isolator means.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
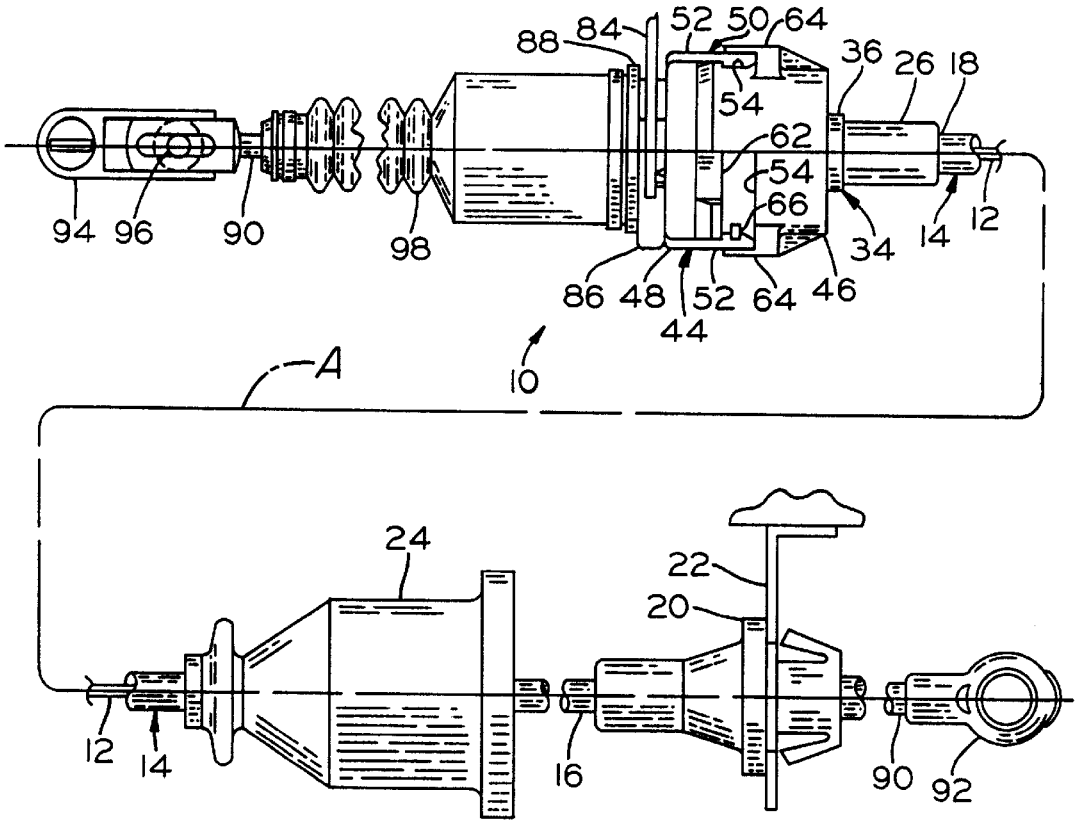
FIG. 1 is a simplified side view of a motion transmitting remote control assembly according to the subject invention.

Referring to the Figures, wherein like numerals indicate like or corresponding parts throughout the several views, a motion transmitting remote control assembly according to the subject invention is generally shown at 10. The assembly 10 is of the type for transmitting motion in a curved path by a flexible core element 12 which is slidably supported in a flexible tubular conduit, generally indicated at 14. As shown in FIG. 1, the conduit 14 has a central axis A and extends therealong between first 16 and second 18 opposite ends. The conduit 14 is preferably of the type having an inner tubular liner manufactured from a synthetic low friction material. A plurality of long lay wires extend in high-lead helical fashion about the inner liner and are encased within an outer plastic jacket, as is well known in the art.

The first end 16 of the conduit 14 includes an end fitting 20 for attaching the first end 16 of the conduit 14 to a support fixture 22. The end fitting 20 may be of any type well known in the art, such as that disclosed in U.S. Pat. No. 4,380,178 to Bennett et al, issued Apr. 19, 1993 and assigned to the assignee of the subject invention, the disclosure of which is hereby incorporated by reference. A bell-shaped seal 24 is slidably disposed along the conduit 14 adjacent the first end 16 for insulating the end fitting 20 against debris, moisture, etc.

Figure 3:
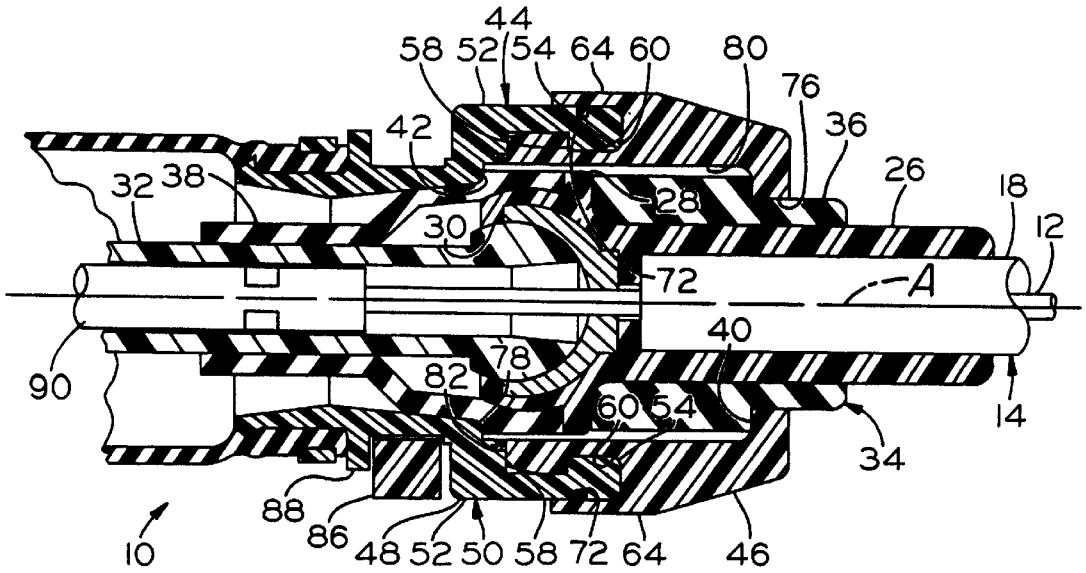
FIG. 3 is a cross-sectional view of the isolator means and casing means assembled and disposed for operation.
Figure 2:
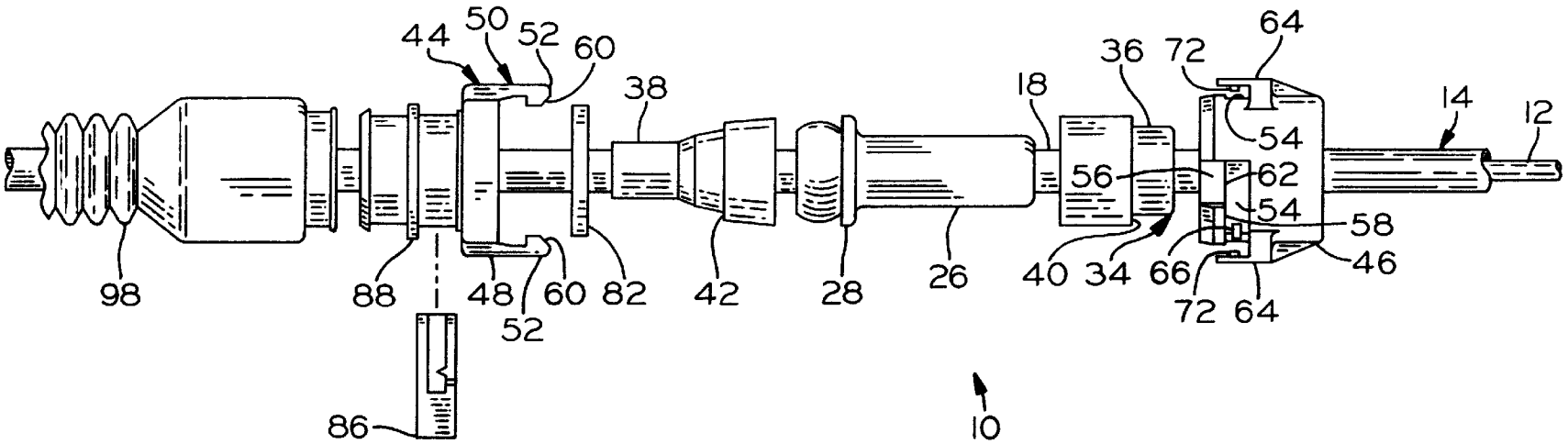
FIG. 2 is an exploded view of the isolator means and casing means as disposed on the subject remote control assembly.

An inner end fitting 26 is fixedly disposed on the second end 18 of the conduit 14. The inner end fitting 26 may be insert molded onto the conduit 14 in typical prior art fashion, such as illustrated in U.S. Pat. No. 4,348,348 to Bennett et al. The inner end fitting 26, as shown in FIGS. 2 and 3, includes a radially extending annular flange 28. The inner end fitting 26 may also include a cup-shaped socket 30 for receiving the male end of a swivel tube insert 32.

An isolator means, generally indicated at 34 in FIGS. 2 and 3, surrounds the second end 18 of the conduit 14 for dampening vibration transmissions to the conduit 14. The isolator means 34 is preferably fabricated from an organic elastomeric material, such as urethane or neoprene, however, it will be appreciated that other materials may be suitable. The isolator means 34 engages opposite sides of the flange 28 when in an installed position, shown in FIG. 3, so that the flange 28 acts as a retaining member, preventing axial movement of the isolator means 34 along the conduit 14.

The isolator means 34 is preferably slidable along the conduit 14 and along the inner end fitting 26 toward the flange 28, i.e., toward the installed position. Although, those skilled in the art will recognize other construction variations, such as one where the isolator means 34 moves to the installed position from laterally opposite (diametrically opposed) sides as in a clam shell or bushing sleeves.

In the preferred embodiment, the isolator means 34 includes a right half section 36 and a left half section 38 disposed on opposite sides of the flange 28. The right half section 36 is a generally cylindrical member having a stepped flange 40 disposed generally midway along its length. The right half section 36 is snugly received over the exterior of the inner end fitting 26 and conforms thereto up to and including the right side of the flange 28, as viewed in FIG. 3. The left half section 38 of the isolator means 34 includes a generally conical portion which surrounds the socket 30 of the inner end fitting 26 in close-fitting engagement and is butted against the left side of the flange 28 as viewed in FIG. 3. The conical portion includes a stepped radially extending flange 42, and converges into a cylindrical extension surrounding the swivel tube 32. The flexibility of the left half section 38 of the isolator means 34 permits free movement of the swivel tube 32 relative to the inner end fitting 26 without pulling away from the flange 28. Because of the two piece construction of the isolator means 34, it is both conveniently installed and removed for inspection/repair, as well as enabling the right 36 and left 38 half sections of the isolator means 34 to be fabricated from different durometer materials, if required.

A casing means, generally indicated at 44 in FIGS. 1–7, is moveable from a detached condition (FIG. 2) to a locked condition (FIGS. 1 and 3–7) for locking the isolator means 34 in place over the second end 18 of the conduit 14. The casing means 44, like the isolator means 34, also includes a right half section 46 and a left half section 48 disposed on opposite sides of the flange 28. Thus, the casing means 44 is of two piece construction which holds the isolator means 34 in its installed position when the right 46 and left 48 half sections of the casing means 44 are clasped together. However, as mentioned above in connection with the isolator means 34, the casing means 44 may also move into the locked position in various alternative manners, such as from laterally opposite (diametrically opposite) sides of the isolator means 34. Preferably, the casing means 44 is fabricated from an injection molded plastic material like that used in the construction of the inner end fitting 26 and also the end fitting 20.

The casing means 44 includes a fastener means, generally indicated at 50 in FIGS. 1–7, for interlocking the right 46 and left 48 half sections. Although the fastener means 50 may take numerous forms such as threads or glue, in the preferred embodiment the fastener means 50 comprises a force-fit snap lock. As illustrated in the Figures, two such force-fit snap locks are provided on diametrically opposed sides of the casing means 44. Therefore, to facilitate description, the same reference numerals are used to designate like and corresponding features of the two force-fit snap locks.

Figure 6:
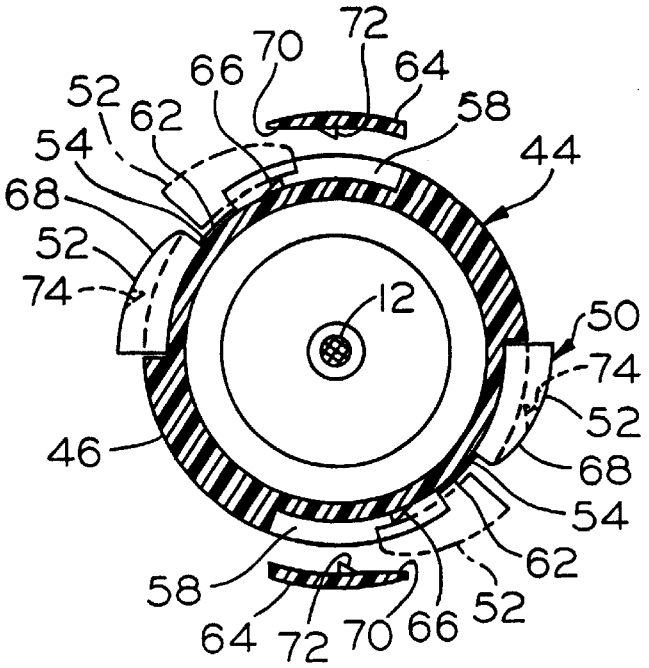
FIG. 6 is a cross-sectional view taken along lines 6—6 of FIG. 4.
Figure 7:
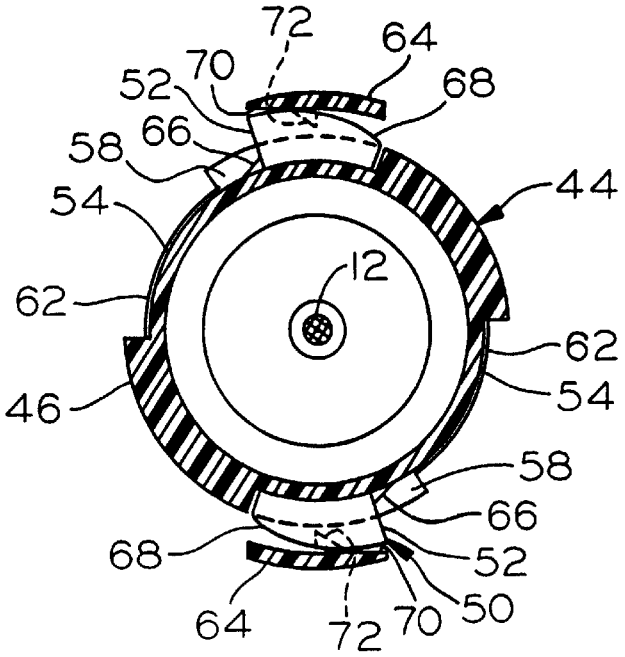
FIG. 7 is a cross-sectional view taken along lines 7—7 of FIG. 5.

The force-fit snap locks each include an axially projecting tang 52 extending from the left half section 48 and a notched channel 54 in the right half section 46 for receiving the tang 52. It will be readily appreciated by those skilled in the art, however, that multiple variations of the fastener means 48 are possible, including reversal of the tang 52 and notched channel 54 configurations on the right 46 and left 48 half sections of the casing means 44. The notched channels 54 are diametrically opposed from one another and each is disposed in an arc of approximately 110°, as best shown in FIGS. 6 and 7. Each notched channel 54 includes a tang receiving ramp 56 and a circumferentially adjacent tang locking ledge 58.

Referring now to FIGS. 2 and 4–7, the right 46 and left 48 half sections of the casing means 44 are clasped, or interlocked, together by positioning the tangs 52 in line with the tang receiving ramps 56 of the right half section 46. Axial forces are then applied to the right 46 and left 48 half sections of the casing means 44 such that a chamfer 60 on the inner leading edges of the two tangs 52 contact the tang receiving ramps 56 and gently cam, or wedge, the tangs 52 in a radially outwardly deflected condition and then finally into the notched channel 54.

Once each of the tangs 52 is seated in the respective notched channel 54, they are held in the notched channel 54 against accidental disengagement by a shallow ledge 62 at the heel of the tang receiving ramp 56. In this position, the right 46 and left 48 half sections of the casing means 44 can be disconnected by manually prying the tangs 52 to clear the shallow ledge 62, while at the same time applying axial separating forces to the right 46 and left 48 half sections. However, under normal circumstances disconnection will not be necessary and a more secure locking condition will be required to prevent accidental separation of the right 46 and left 48 half sections of the casing means 44 during actual use of the assembly 10. Thus, to effect a more securely locked condition, the right 46 and left 48 half sections of the casing means 44 are rotated approximately 90°, as shown in FIGS. 6 and 7, so that the tangs 52 slide circumferentially in the notched channel 54 to a position adjacent of the tang locking ledge 58. Because the tang locking ledge 58 is significantly higher than the shallow ledge 62 at the heel of the tang receiving ramp 56, disconnection of the two half sections 46, 48 would be very difficult.

Figure 4:
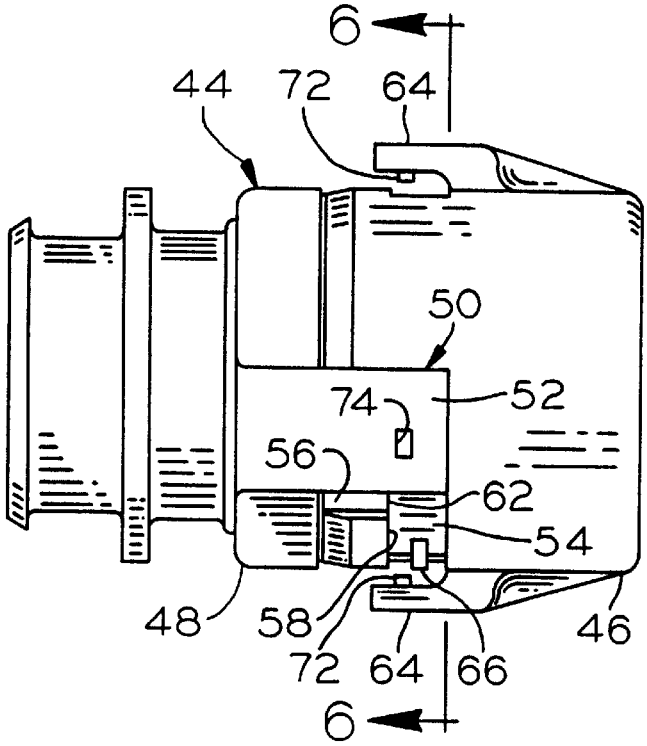
FIG. 4 is a side view of the right and left casing halves disposed in an initially engaged condition.
Figure 5:
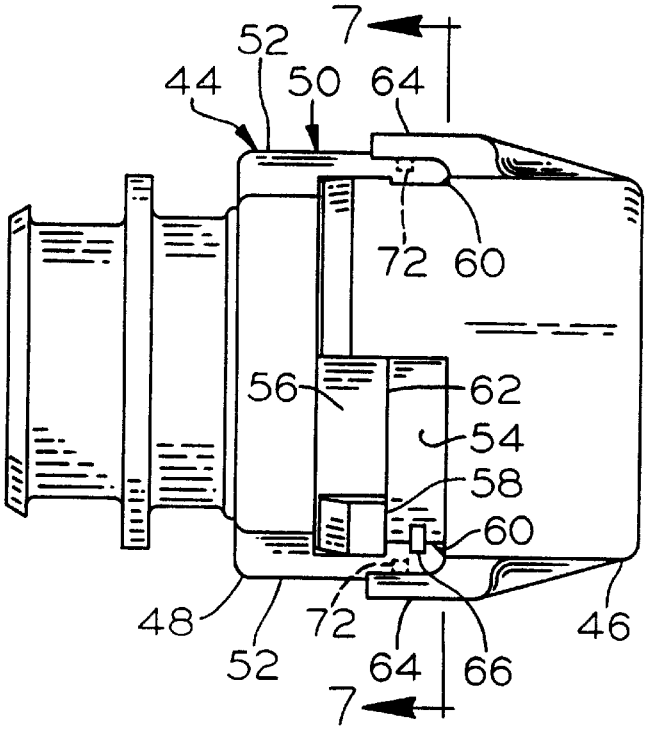
FIG. 5 is a side view of the casing means as in FIG. 4 showing the right and left half sections rotated approximately 90° into a fully locked condition.

In the preferred embodiment, the force-fit snap locks each include an auxiliary retainer means for retaining each of the tangs 52 adjacent the tang locking ledges 58, i.e., in the position shown in FIGS. 5 and 7. The auxiliary retainer means may take many forms, and those skilled in the art will readily appreciate numerous alternatives and mechanical equivalents to those described below. However, in the preferred embodiment, the auxiliary retainer means includes an ear 64 fixed relative to the notched channel 54 and extending over the tangs 52 when adjacent the tang locking ledge 58. The ears 64 act as a blockade to prevent the tangs 52 from flexing outwardly a sufficient distance to clear the tang locking ledge 58, and as a shield against prying tools. The ears 64, as best shown in FIGS. 4 and 5, are cantilevered out from the right half section 46 of the casing means 44. However, in an alternative embodiment, not shown, the ears 64 include an extra radially extending support wall making them non-cantilevered.

The auxiliary retainer means also includes a lower retaining tooth 66 extending outwardly from each notched channel 54. As most clearly shown in FIGS. 6 and 7, the lower retaining tooth 66 seats behind the tang 52 when in the fully locked condition adjacent the tang locking ledge 58 to prevent the tangs 52 from being rotated out of the locked position. In an alternative embodiment, not shown, the lower retaining tooth 66 is slightly spaced from the tang 52 when in the fully locked condition. Each lower retaining tooth 66 has a triangular wedge-like configuration which causes the associated tang 52 to flex outwardly as it is rotated over the lower retaining tooth 66, as shown in phantom in FIG. 6. To establish sufficient clearance between each tang 52 and ear 64, and to prevent binding, the leading edge 68 of each tang 52 is sloped and the corresponding trailing edge 70 of each ear 64 is sloped. Thus, as the tangs 52 are rotated toward the locked position adjacent the tang locking ledge 58, they will not touch or will only gently touch the associated ear 64.

For yet additional retention, the auxiliary retainer means may also include an upper retaining tooth 72 extending inwardly from each of the ears 64. A corresponding socket 74 is formed in each of the tangs 52 for engaging the upper retaining tooth 72 when the tang is positioned in the fully locked condition adjacent the tang locking ledge 58. In this manner, the left half section 48 of the casing means 44 is locked against both axial and rotative movement relative to the right half section 46 when the tangs 52 are disposed in the locked condition adjacent the tang locking ledge 58 to effectively prevent unwanted disconnection of the two half sections 46, 48.

The right half section 46 of the casing means 44 includes a lip 76 disposed in tight fitting engagement against the stepped flange 40 of the right half section 36 of the isolator means 34 when in the locked and operative position. Likewise, the left half section 48 of the casing means 44 includes a shoulder 78 pressing against the stepped flange 42 of the left half section 38 of the isolator means 34. In this manner, the casing means 44 is completely isolated from the inner end fitting 26 by way of the isolator means 34, along with a vacant spacing 80 between the flange 28 and the casing means 44. Thus, any vibration imparted to the casing means 44 is transmitted directly to the isolator means 34 as there is no direct contact between the casing means 44 and the inner end fitting 26 or any other portion of the conduit 14.

To help seal the casing means 44 against penetration by moisture or other unwanted debris, a gasket 82 is disposed between the right 46 and left 48 half sections, and is seated in a groove formed in the left half section 48.

In typical use, the second end 18 of the conduit 14 may be attached to a support fixture 84 which, in turn, may be attached to a vibrating element such as a vehicular transmission. An attachment means 86 has an operative position adjacent the second end 18 of the conduit 14 for attaching the conduit 14 to the vibrating support fixture 84. The attachment means 86 is disposed in the operative position, shown in FIGS. 1 and 3, when the right 46 and left 48 half sections of the casing means 44 are in the locked condition. Thus, when the casing means 44 is in its detached condition as in FIG. 2, the attachment means 86 is not in its operative position. Once the casing means 44 is moved from its detached condition to its locked condition, the casing means 44 functions to mechanically lock and retain the attachment means 86 in its operative position while at the same time maintaining vibration isolation between the attachment means 86 and the conduit 14.

The attachment means 86 may take various forms, as will be appreciated by those skilled in the art. A rotating slide snap construction as illustrated in U.S. Pat. No. 4,951,524 to Niskanen, issued Aug. 28, 1990 and assigned to the assignee of the subject invention, the disclosure of which is hereby incorporated by reference, will provide satisfactory results. The attachment means 86, thus, clips over the left half section 48 of the casing means 44 and is retained axially in place between the tangs 52 and the flange 88. Alternatively, an axially forced snap construction as illustrated in U.S. Pat. No. 4,406,177 will also provide satisfactory results.

When the assembly 10 is designed for use with a vehicular transmission, or any other application where the core element 12 is required to transmit compressive as well as tensile loads, the two unsupported extending ends of the core element 12 will include a rigid shaft 90 crimped to the flexible cable portion of the core element 12. A terminal 92 is provided on the one end of the core element 12 adjacent the first end 16 of the conduit 14 for connecting to a control member (not shown), and a terminal 94 is connected to the core element 12 at the other, distal end adjacent the second end 18 of the conduit 14 for connection to a controlled member (not shown). The terminal 94 may, as shown in FIG. 1, include a length adjustment mechanism 96 of any type well known in the art. Also, a dust boot 98 can be attached to prevent entry of unwanted debris into the inner passage of the conduit 14. The dust boot 98 is connected between the left half section 48 of the casing means 44 and the shaft 90 adjacent the terminal 94.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

[1. A motion transmitting remote control assembly (10) of the type for transmitting motion in a curved path, said assembly (10) comprising: a flexible tubular conduit (14) having opposite ends (16, 18); a flexible core element (12) slidably supported in said conduit (14); isolator means (34) surrounding one of said ends (18) of said conduit (14) for dampening vibration transmission to said conduit (14); attachment means (86) having an operative position adjacent said one end (18) of said conduit (14) for attaching said conduit (14) to a vibrating support fixture (84); casing means (44) moveable from a detached condition to a locked condition for mechanically locating and retaining said attachment means (86) in said operative position while maintaining vibration isolation between said attachment means (86) and said conduit (14), said casing means (44) including a right half section (46) and a left half section (48); and characterized by fastener means (50) for manually interlocking said right (46) and left (48) half sections of said casing means (44) to place said casing means (44) in said locked condition.]

2. An assembly as set forth in claim [1] *21* wherein said isolator means (34) is fabricated from an elastomeric material.

3. An assembly as set forth in claim [1] *21* wherein said conduit (14) is formed about a longitudinally extending central axis (A), further including an inner end fitting (26) fixedly disposed on said [one] *second* end (18) of said conduit (14), said inner end fitting (26) having a radially extending flange (28).

4. An assembly as set forth in claim 3 wherein said isolator means (34) engages opposite sides of said flange (28) in an installed position.

5. An assembly as set forth in claim 4 wherein said isolator means (34) is slidable along said conduit (14) into said installed position.

6. An assembly as set forth in claim 5 wherein said isolator means (34) includes a right half section (36) and a left half section (38) disposed on opposite sides of [the] said flange (28).

7. An assembly as set forth in claim 4 wherein said right half section (46) and said left half section (48) of said casing means (44) are disposed on opposite sides of said flange (28).

8. An assembly as set forth in claim 7 wherein said [fastener means] *snaplock* (50) includes a pair of *said* force-fit snap locks.

9. An assembly as set forth in claim 8 wherein said force-fit snap locks are diametrically opposed from one another.

[10. An assembly as set forth in claim 1 wherein said fastener means (50) includes a force-fit snap lock.]

11. An assembly as set forth in claim [10] *21* wherein said force-fit snap lock includes a male barb formed on one of said right (46) and left (48) half sections of said casing means (44) and a female groove formed in the other of said right (46) and left (48) half sections of said casing means (44) for receiving said male barb.

12. An assembly as set forth in claim [10] *21* wherein said force-fit snap lock includes an axially projecting tang (52) extending from one of said right (46) and left (48) half sections of said casing means (44) and a notched channel (54) in the other of said right (46) and left (48) half sections of said casing means (44) for engaging said tang (52).

13. An assembly as set forth in claim 12 wherein said conduit (14) is formed about a longitudinally extending central axis (A) and wherein said notched channel (54) is disposed in an arc centered about said central axis (A) and includes a tang receiving ramp (56) and a tang locking ledge (58).

[14. An assembly as set forth in claim 13 wherein said force-fit snap lock includes auxiliary retainer means for retaining said tang (52) adjacent said tang locking ledge (58).]

15. [An assembly as set forth in claim 14] *A motion transmitting remote control assembly (10) for transmitting motion in a curved path, said assembly (10) comprising:*

*a flexible tubular conduit (14) having opposite, first and second ends (16, 18);*

*a flexible core element (12) slidably supported in said conduit (14);*

*isolator means (34) surrounding said second end (18) of said conduit (14) for dampening vibration transmission to said conduit (14);*

*attachment means (86) adjacent said second end (18) of said conduit (14) having an operative position for attaching said conduit (14) to a vibrating support fixture (84);*

*casing means (44) for locking said isolator means (34) in place over said second end (18) of said conduit (14) and including a right half section (46) and a left half section (48);*

*a force-fit snap lock (50) movable from a detached condition to a locked condition to mechanically interlock said half sections (46, 48) together in response to axial forces applied to mechanically interlock said casing means (44) to maintain vibration isolation between said attachment means (86) and said conduit (14) as said attachment means (86) is mechanically located and retained in said operative position attached to the vibrating support fixture (84);*

*said assembly characterized by including an additional auxiliary retainer comprising a mechanical interlock for mechanically retaining through a mechanical interference said force fit snap lock (50), said force-fit snap lock including an axially projecting tang (52) extending from one of said right (46) and left (48) half sections of said casing means (44) and a notched channel (54) with a tang locking ledge (58) in the other of said right (46) and left (48) half sections of said casing means (44) for engaging said tang (52)* wherein said auxiliary retainer [means] includes an ear (64) fixed relative to said notched channel (54) and extending over said tang (52) when adjacent said tang locking ledge (58).

16. An assembly as set forth in claim 15 wherein said auxiliary retainer [means] includes a lower receiving tooth (66) extending outwardly from said notched channel (54).

17. An assembly as set forth in claim 16 wherein said auxiliary retainer [means] includes an upper retaining tooth (72) extending inwardly from said ear (64).

18. An assembly as set forth in claim 17 wherein said auxiliary retainer [means] includes a socket (74) in said tang (52) for engaging said upper retaining tooth (72) when said tang (52) is disposed adjacent said tang locking ledge (58).

19. An assembly as set forth in claim 17 further including a gasket (82) disposed between said right (46) and left (48) half section of said casing means (44).

20. An assembly as set forth in claim [19] *21* wherein said isolator means (34) includes a pair of stepped flanges (40, 42), with said right (46) and left (48) half sections of said casing means (44) engaging said stepped flanges (40, 42).

*21. A motion transmitting remote control assembly (10) for transmitting motion in a curved path, said assembly (10) comprising:*

*a flexible tubular conduit (14) having opposite, first and second ends (16, 18);*

*a flexible core element (12) slidably supported in said conduit (14);*

*isolator means (34) surrounding said second end (18) of said conduit (14) for dampening vibration transmission to said conduit (14);*

*attachment means (86) adjacent said second end (18) of said conduit (14) having an operative position for attaching said conduit (14) to a vibrating support fixture (84);*

*casing means (44) for locking said isolator means (34) in place over said second end (18) of said conduit (14) and including a right half section (46) and a left half section (48);*

*a force-fit snap lock (50) moveable from a detached condition to a locked condition to mechanically interlock said half sections (46, 48) together in response to axial forces applied to mechanically interlock said casing means (44) to maintain vibration isolation between said attachment means (86) and said conduit (14) as said attachment means (86) is mechanically located and retained in said operative position attached to the vibrating support fixture (84);*

*said assembly characterized by including an additional auxiliary retainer comprising a mechanical interlock with discrete abutting surfaces for mechanically retaining through a mechanical interference said force fit snap lock (50).*

*22. An assembly as set forth in claim 21 wherein said force-fit snap lock includes at least one flexible tang and a locking ledge for receiving said tang.*

*23. An assembly as set forth in claim 22 wherein said auxiliary retainer prevents said tang from being removed from said locking ledge.*

*24. An assembly as set forth in claim 21 wherein said right half section (46) includes a lip (76) and said left half section (48) includes a shoulder (78), said isolator means (34) extends axially between said lip (76) and said conduit (14) and extends axially under said shoulder (78) thereby completely isolating said casing (44) from said conduit (14) and any other portion of said assembly supporting said core element (12).*

*25. An assembly as set forth in claim 24 including an end fitting (26) disposed on said second end (18) of said conduit (14 ) and presenting a socket (30), a swivel tube (32) having a male end disposed in said socket (30), said isolator means (34) completely isolating said shoulder (78) of said casing means (44) from said socket (30).*

* * * * *